(No Model.)

E. TANNEWITZ.
PIVOT BEARING FOR PLATFORM SCALES.

No. 519,485. Patented May 8, 1894.

Witnesses:
Myron C. Lisle.
Frank W. Tidball.

Inventor
Edward Tannewitz
By Ithiel J. Cilley
Attorney

THE NATIONAL LITHOGRAPHING COMPANY,
WASHINGTON, D. C.

UNITED STATES PATENT OFFICE.

EDWARD TANNEWITZ, OF GRAND RAPIDS, MICHIGAN.

PIVOT-BEARING FOR PLATFORM-SCALES.

SPECIFICATION forming part of Letters Patent No. 519,485, dated May 8, 1894.

Application filed May 27, 1893. Serial No. 475,783. (No model.)

*To all whom it may concern:*

Be it known that I, EDWARD TANNEWITZ, a citizen of the United States, residing at Grand Rapids, in the county of Kent and State of Michigan, have invented certain new and useful Improvements in Pivot-Bearings for Weighing-Scales, of which the following is a specification.

My invention relates to improvements in the bearings by means of which the weighing beams in hay, and other large platform scales, are suspended and supported from the outer or crib frame of the scales, and its objects are: first, to insure a perfect adjustment, or alignment of the bearings with the shaft; and, second, to provide for securing the bearings firmly upon the shaft. I attain these results by the mechanism illustrated in the accompanying drawings, in which—

Figure 1:
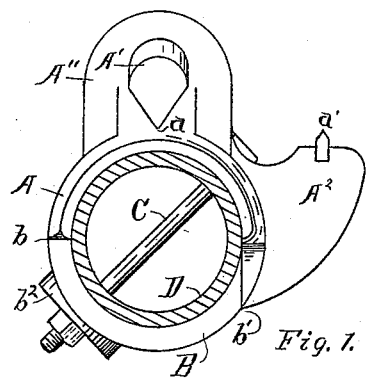
Figure 2:
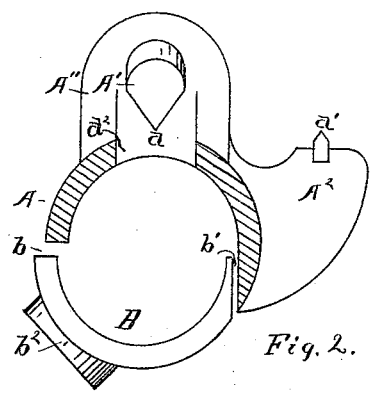
Figure 3:
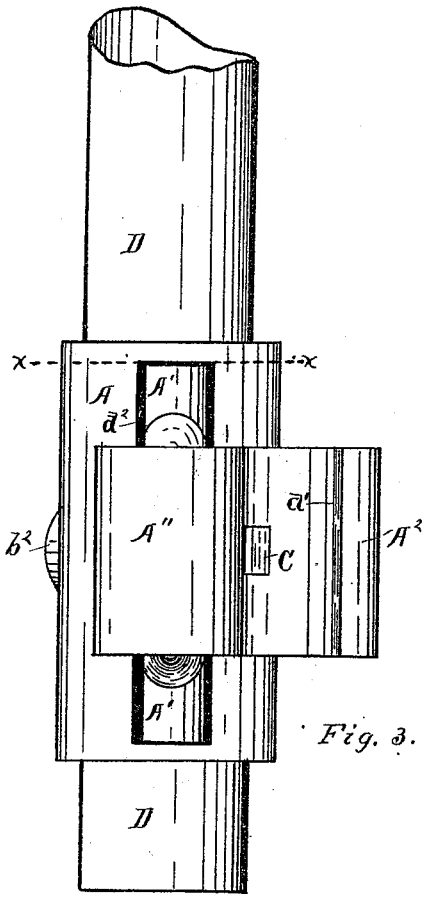

Figure 1. is an end elevation of my device, with a hollow shaft in position. Fig. 2 is the same with the end of the upper portion cut off on the line $x\ x$ of Fig. 3, to show the opening in the body below the bearings, the shaft removed and the parts separated to show the joints or points of contact. Fig. 3. is a plan of the same; and Fig. 4. is a side elevation.

Similar letters refer to similar parts throughout the several views.

Figure 4:
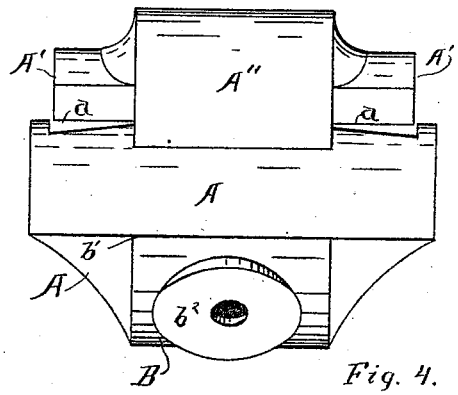

With ordinary bearings, now in use upon large platform scales, the portion $A''$ of my device represents the entire length of bearing upon the shaft the pivot bearings $A'$ projecting their entire length beyond any point of bearing upon the shaft which renders it almost impossible to procure a perfect adjustment, or alignment of the bearing with the shaft, in consequence of which the bearing is likely to be entirely upon one side. To obviate this difficulty I project the upper portion A, of the portion of my bearing that surrounds and clamps the shaft, beyond the outer ends of the pivots $A'$, as shown in Figs. 3 and 4, so as to insure a long surface of contact upon the upper surface of the shaft, by which means I am insured a perfect alignment of the V-shaped bearings with the shaft.

The second object attained by my device consists of attaching the bearings firmly and securely to the shaft. This I accomplish by dividing the bearing vertically at $b'$ and horizontally at $b$. I then arrange to pass a bolt C through the body A, the shaft D and the boss $b^2$ on the clamp, or under portion, B, of the bearing, at such an angle that the clamp B will incline to slip toward the shaft at the parting $b$, and will be drawn firmly against the side of the body A at the parting $b'$ with the continued inclination to draw both portions A and B snugly upon the shaft. By this means the weight that is exerted upon the point $d'$, the fulcrum point of the bearing being at $d$, tends to throw the arm $A^2$ around against the clamp B. and to utilize, not only, the entire strength of the clamp to prevent it from sliding upon its end as would be the case if a horizontal division were made here, but taken together with the position of the bolt C will increase the strength of its arm, and at the same time press the clamp against the shaft more snugly, and with far better effect than if parted the other way. By this means I am enabled to dispense, entirely, with the use of wedges and other toggling appliances now in common use for aligning and securing this bearing, and can secure the bearing so firmly upon the shaft that there will be no danger, either of its getting out of alignment or of becoming loose upon the shaft and slipping.

I form an opening $d^2$ through the upper side of the wings of the body A, directly under the bearings $A'$, which acts a double purpose: first, of enabling one to mold this portion of my appliance for casting, in soft sand, without necessitating the use of a core; and, second, it makes room for attaching the supporting bearing, and also to operate the same without cramping or binding upon the body.

As the manner of attaching the ordinary pivot bearing, in scales, to the supporting links and levers, is identical with my device, and is well known to those versed in the art, I do not deem it necessary for me to enter into a detailed description of this feature, or to attempt to illustrate it in the drawings, but,

Having thus fully described my invention and its connection with the immediate portion of the scales to which it more particularly applies, what I claim as new, and desire to secure by Letters Patent of the United States, is—

1. In a pivot bearing, a body fitted for the reception of the shaft and divided to form semicircles, one line of division being upon the radial line of the circle, and the opposite line of division being upon a tangent to the periphery of the shaft and at right angles with the radial line of division, and a bolt for clamping said semi-circles together and securing them firmly to the shaft substantially as shown and described.

2. In a pivot bearing for scales, a body fitted to encompass one half of the circumference of the shaft, a head projecting upward from said body and provided at each end with an over-hanging pivot bearing, the body projecting longitudinally beyond the ends of the pivot bearings and provided, immediately below each, with an opening, an arm projecting out from one side of said body and provided with a second pivot bearing, a segment for encompassing the shaft opposite the body, one of the lines of division between said body and segment being radial, and the other at right angles therewith and tangential to the periphery of shaft, and a bolt for securing the same to the shaft, substantially as and for the purpose set forth.

Signed at Grand Rapids, Michigan, this 20th day of May, A. D. 1893.

EDWARD TANNEWITZ.

In presence of—
ITHIEL J. CILLEY,
JOHN C. BUCHANAN.